United States Patent [19]
Kahle

[11] Patent Number: 5,270,576
[45] Date of Patent: Dec. 14, 1993

[54] ELECTRICAL CONNECTOR NETWORK
[75] Inventor: Rolf D. Kahle, Saratoga, Calif.
[73] Assignee: Compulog Corporation, Saratoga, Calif.
[21] Appl. No.: 847,467
[22] Filed: Mar. 6, 1992
[51] Int. Cl.$^5$ ........................................... H01H 47/00
[52] U.S. Cl. ................................ 307/131; 361/187; 361/186; 307/38; 307/125
[58] Field of Search ................ 307/131, 38, 112, 125, 307/130, 10.8, 13, 14; 361/160, 170, 186, 187, 93, 191, 189

[56] References Cited

U.S. PATENT DOCUMENTS

| | | | |
|---|---|---|---|
| 2,835,830 | 5/1958 | Rathenau | 307/114 |
| 2,851,550 | 9/1958 | Searcy | 200/51.02 |
| 2,979,624 | 4/1961 | Askerneese | 307/38 |
| 2,988,655 | 6/1961 | Rudolph et al. | 307/114 |
| 3,334,250 | 8/1967 | Gwin, Jr. | 307/114 |
| 3,514,626 | 5/1970 | Platzer, Jr. | 307/114 |
| 3,558,902 | 1/1971 | Casey | 307/112 |
| 3,928,737 | 12/1975 | Prasert | 200/51 |
| 4,109,231 | 8/1978 | Krouse | 338/200 |
| 4,213,313 | 7/1980 | Kiefer | 68/12 R |
| 4,578,593 | 3/1986 | Davidov | 307/113 |
| 4,970,623 | 12/1990 | Pintar | 361/187 |
| 5,099,157 | 3/1992 | Meyer | 307/632 |

OTHER PUBLICATIONS

Delux Power Center Owner's Manual, Jan. 1987, 802-0214, Printer in U.S.A., ©1986 Tandy Corporation.

Primary Examiner—Howard L. Williams
Assistant Examiner—Aditya Krishnan
Attorney, Agent, or Firm—Townsend and Townsend Khourie and Crew

[57] ABSTRACT

The invention provides an electrical connector network for coordinately controlling multiple electrical appliances connected to the network. The network comprises a control outlet connected to an electrical power inlet, at least one slave outlet, and means responsive to current flow to the control outlet for selectively connecting the slave outlets to the power inlet, whereby power is available at the slave outlets only when current flows through the control outlet. In a preferred embodiment, the invention includes a current transformer for sensing current to the control outlet, the transformer producing a secondary current which is conditioned by an amplifier to drive a power triac, actuating a relay controlling power to the slave outlets. The connector network may be embodied in various structures, including extension cords, power strips, wall outlets or electrical appliances.

15 Claims, 6 Drawing Sheets

ELECTRICAL CONNECTOR NETWORK

BACKGROUND OF THE INVENTION

The present invention relates generally to electrical connectors, and more specifically to electrical connector networks for connecting multiple electrical devices to a power supply and controlling the devices in a coordinated manner.

When several electrical appliances, such as audio and video components, computer systems, lamps and the like, are used within a single room, office or workstation, it is often desirable to be able to turn the devices on and off together. For example, when the central processing unit (CPU) of a personal computer system is turned on, it is usually desirable to have the video monitor, printer and other peripherals turned on at the same time. When the amplifier of a component stereo system is turned on, it is convenient to have the turntable, CD player, or tape deck turned on simultaneously. Or, where a room has two lamps, one in an accessible place and the other in a more inaccessible place, it is convenient to have the remote lamp controlled coordinately with the more accessible lamp.

A known method for coordinately controlling various electrical devices connected to the same power supply is to install a switch in the power line between the supply and the devices. In a room or office, a single wall switch may control multiple wall outlets. An extension cord having multiple receptacles for connecting electrical appliances may have a switch disposed between the power plug and the receptacles. Similarly, a power strip is frequently used for connecting computer systems or audio systems to a wall outlet, the power strip typically consisting of a rigid housing in which multiple outlets are disposed, along with a switch which turns the outlets on and off together.

While providing a switch in an electrical supply line to multiple outlets is effective for coordinately controlling the electrical appliances connected to the outlets, such techniques have several disadvantages. For example, it is often less convenient to turn on and off the electrical devices from a remote switch, rather than from a switch on the device itself. In addition, when devices are connected to switchable wall outlets, extension cords or power strips, the device switches are typically left in the on position at all times, and only the remote switch is used. Thus, there is a redundancy of switching hardware which might be avoided to simplify operation and reduce cost.

For these and other reasons, it would be desirable to provide an electrical connector network which allowed coordinated power switching of all of the appliances connected to the network. The network should not require the devices to be turned on and off from a remote switch. Preferably, the network should allow all of the devices to be turned on and off when a switch on one of the devices is actuated. Preferably, the connector network should be adaptable to various structures, including wall outlets, extension cords and power strips. The connector network should further create no significant voltage drop in the power delivered to the appliances. In addition, it would be desirable if the connector network provided noise filtering of the supplied power.

SUMMARY OF THE INVENTION

The present invention provides an electrical connector network for coordinately controlling multiple electrical appliances connected to the network. The invention eliminates the need for an additional switch between the power supply and the electrical appliances. The connector network can be embodied in various forms, including wall outlets, extension cords, power strips or electronic components. The connector network creates no significant voltage drop in the power delivered to the electrical appliances. Further, by actuating the switch on one of the appliances connected to the network, power to all of the additional appliances connected to the network is turned on and off coordinately. Preferably, the connector network is provided with a power noise filter to protect the appliances connected to the network against power surges.

According to one aspect of the invention, the electrical connector network comprises a control outlet connected to an electrical power inlet, at least one slave outlet, and means responsive to current flow to the control outlet for selectively connecting the slave outlet to the power inlet, whereby power is available at the slave outlet only when current flows through the control outlet. Usually, the means responsive to current flow to the control outlet for selectively connecting the slave outlet to the power inlet will comprise a current sensor for sensing current to the control outlet, and a switching device controlling current flow to the slave outlet, the switching device being responsive to a signal from the current sensor. In a preferred embodiment, the current sensor comprises a current sense transformer connected to an amplifier having a rectifier and a filter. In this embodiment, the switching device preferably will comprise a power triac responsive to current from the amplifier, and a power relay responsive to current flow through the triac connected between the power inlet and the slave outlets. The current sense transformer produces a low level secondary current, which is conditioned by the amplifier, the output of the amplifier activating the triac, causing current to flow through the triac, actuating the power relay, thereby connecting the slave outlets to the power inlet.

In a second exemplary embodiment, the current sensor comprises a first relay connected between the power inlet and control outlet, and the switching device comprises a second relay responsive to current flow through the first relay connected between the power inlet and slave outlets.

In various embodiments, the electrical connector network is disposed in an extension cord which can be connected to a wall outlet, in a power strip similarly connected to a wall outlet, or in wall outlets in a building or other structure. The invention can further be embodied in an electrical appliance or electronic component such as a personal computer or stereo with slave outlets mounted into the housing. In this embodiment, rather than sensing current to a control outlet, the current flow to the appliance or component itself is sensed by a current sensor when the device is turned ON, thereby causing current flow to the slave outlets. Other associated appliances or components, e.g. computer peripherals or stereo components, are connected to the slave outlets.

The invention is particularly useful because it allows a number of electrical appliances coupled to the connector network to be controlled using the switch of a single "control" appliance. For example, by switching on a lamp connected to the control outlet, any other lamps connected to the slave outlets can be turned on simultaneously. A computer CPU can be connected to the control outlet, with the peripherals connected to the slave outlets, allowing the user to turn on and off all of the components of the system simply by switching the CPU on and off using the switch on the CPU. Similarly, switching on and off the amplifier of a component stereo system plugged into the control outlet simultaneously controls the additional components plugged into the slave outlets. No significant voltage drop or power dissipation occurs through the connector network to either the control or slave outlets. In addition, in the extension cord or power strip embodiments, the connector network can be connected to a conventional wall outlet to coordinately control multiple appliances in the area without modification to the existing electrical system (e.g. installation of switches).

A further understanding of the nature and advantages of the invention may be realized by reference to the remaining portions of the specifications and the drawings.

DESCRIPTION OF THE SPECIFIC EMBODIMENTS

Figure 1:
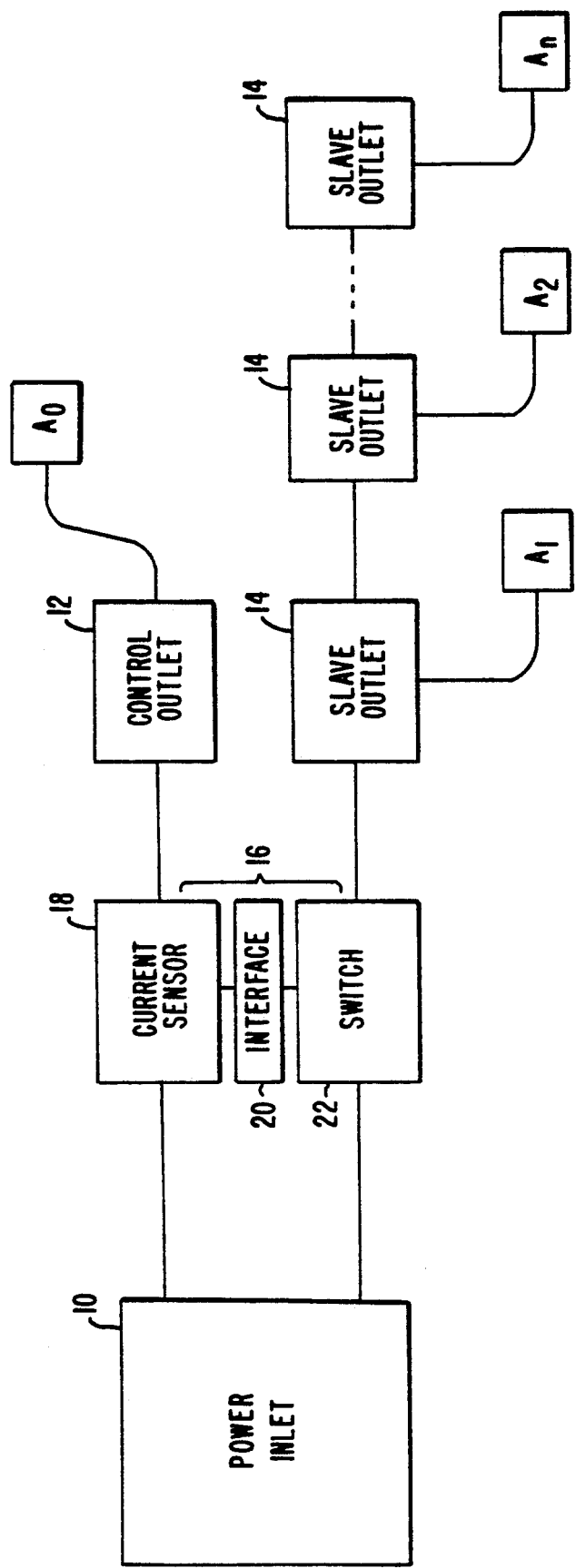
FIG. 1 is a block diagram of the electrical connector network.

As shown in FIG. 1, the apparatus of the present invention comprises an electrical connector network for connecting N electrical appliances $A_0$ to $A_n$ to a power inlet 10. The power inlet 10 may comprise an electrical cord which can be connected to a wall outlet or other power supply, or power inlet 10 may comprise the power wires in a home or office building, an electrical generating unit, or other device for making power available to appliances $A_0$ to $A_n$. A control outlet 12 is connected to power inlet 10 providing a power source for appliance $A_0$. Slave outlet 14 is connected to power inlet 10 through switch 22. A means 16 responsive to current flow to the control outlet 12 selectively connects the slave outlet 14 to the power inlet 10, so that power from the power inlet is available at the slave outlet only when current flows through the control outlet. Means 16, in a preferred embodiment, comprises a switch 22, interface 20 and current sensor 18. In various embodiments, a plurality of slave outlets may be connected in a manner similar to slave outlet 14, either in series or in parallel with slave outlet 14, for connecting a plurality of electrical appliances $A_1$ through $A_n$.

Figure 2:
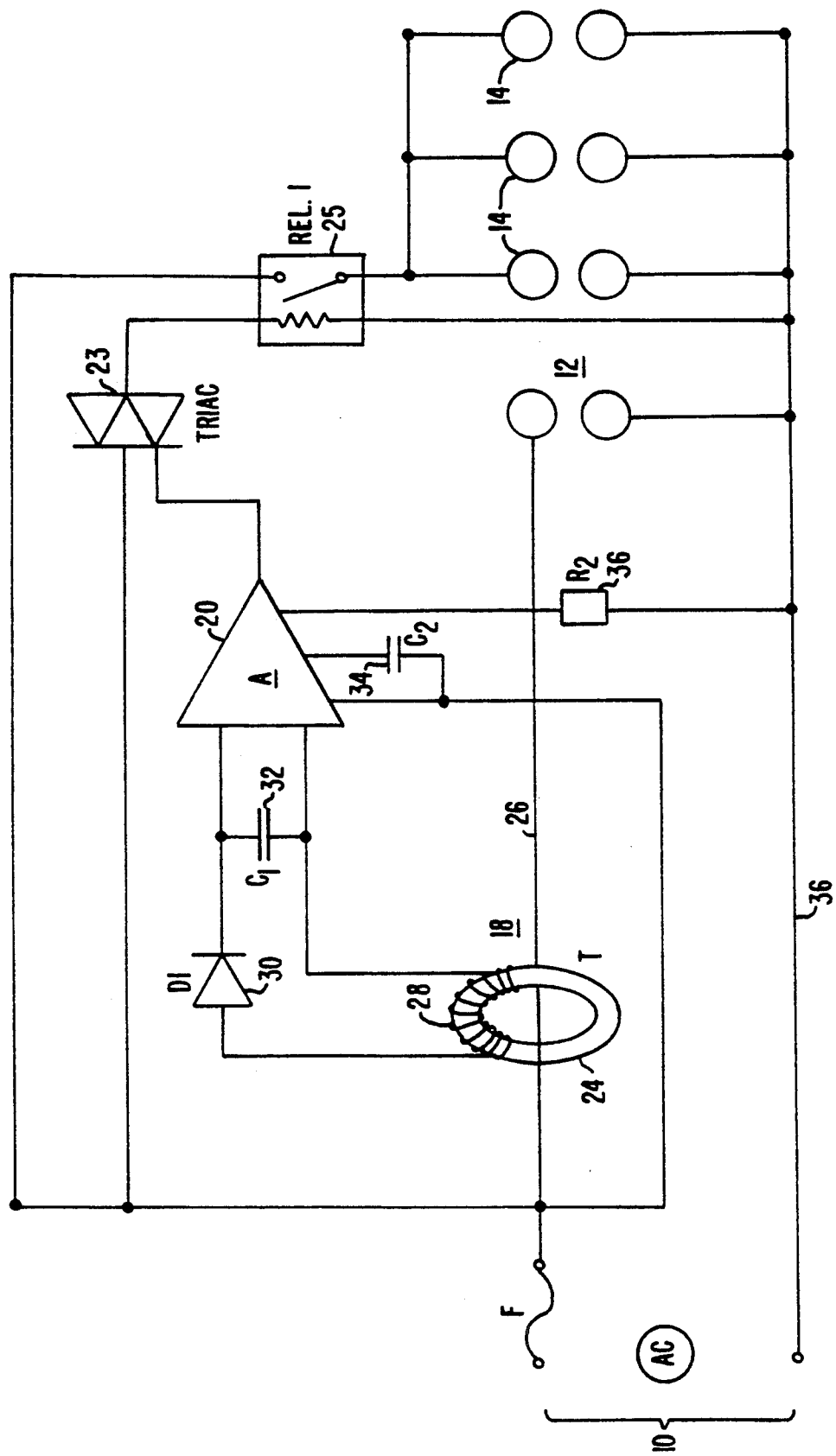
FIG. 2 is a circuit schematic of a preferred embodiment of the electrical connector network of FIG. 1 with a current sense transformer (T), amplifier (A), rectifier/filter (D1, C1), power relay (Rel.1), power triac, external power supply components (C2, R2) for amplifier (A), and fuse or circuit breaker (F).

In a preferred embodiment, current sensor 18 comprises a current sense transformer, as shown in FIG. 2. Current sense transformer 18 comprises a ring core 24 disposed about inlet line 26 connecting control outlet 12 to power inlet 10. Secondary winding 28 of conductive wire is wound about ring core 24 in a radial manner to form a plurality of loops or turns. Preferably, secondary winding 28 comprises between 200 and 1500 turns around ring core 24. Transformer 18 is preferably capable of sensing current between 5 milliamps and the carrying capacity of inlet line 26 without disturbing the electrical circuit in terms of voltage drop or power dissipation.

Secondary winding 28 is connected to interface means 20, which, in this embodiment, comprises an amplifier for conditioning current from secondary winding 28 for actuating switch 22. In a preferred embodiment, the amplifier includes a rectifier 30 and a filter 32, the rectifier 30 and filter 32 usually comprising a diode and a capacitor. The amplifier 20 further comprises a capacitor 34 and a resistor 36 for conditioning the power supply to operate the amplifier. In addition, the amplifier preferably includes line zero crossing detection and trigger pulse generation (not shown) to drive switch 22, which, in this embodiment, is preferably a power triac 23 driving a power relay 25. A commercially-available integrated circuit, for example, part No. CA3079 available from Motorola Corporation of Phoenix, Arizona, contains all circuitry described in amplifier 20, except signal rectifier 30.

In the embodiment shown in FIG. 2, the electrical connector network operates as follows. Current from power inlet 10 is made continuously available at control outlet 12 through inlet line 26 and ground line 36. When an appliance connected to control outlet 12 is turned on, current flow to control outlet 12 from power inlet 10 through current sense transformer 18. Inlet line 26 forms a single turn primary through the center of ring core 24. Current flow through inlet line 26 to control outlet 12 creates magnetic flux in ring core 24, which generates a secondary current in secondary winding 28. Secondary current flows from secondary winding 28 through diode 30 and capacitor 32, leaving the current unidirectional and substantially non-fluctuating. Amplifier 20, receiving power from power inlet 10 through capacitor 34 and resistor 36, conditions the secondary current to proper levels for actuating power triac 23. Upon receiving current from amplifier 20, triac 23 is placed in an "on" state, causing current flow to relay 25. Relay 25 is actuated, connecting slave outlets 14 to power inlet 10. Thus, by switching on appliance $A_0$ connected to control outlet 12, power is coordinately supplied to appliances $A_1$ to $A_N$ coupled to slave outlets 14. When appliance $A_0$ is turned off, current flow to control outlet 12 is discontinued, secondary current form transformer 18 ceases to flow, and triac 22 returns to its "off" state, thereby disconnecting slave outlets 14 from power inlet 10.

In some applications, triac 23 could be connected directly between power inlet 10 and slave outlets 14 without power relay 25. In this embodiment, when current flows to control outlet 12, transformer 18 generates a secondary current which is conditioned by amplifier 20, actuating triac 23, which connects slave outlets 14 to power inlet 10.

Figure 3:
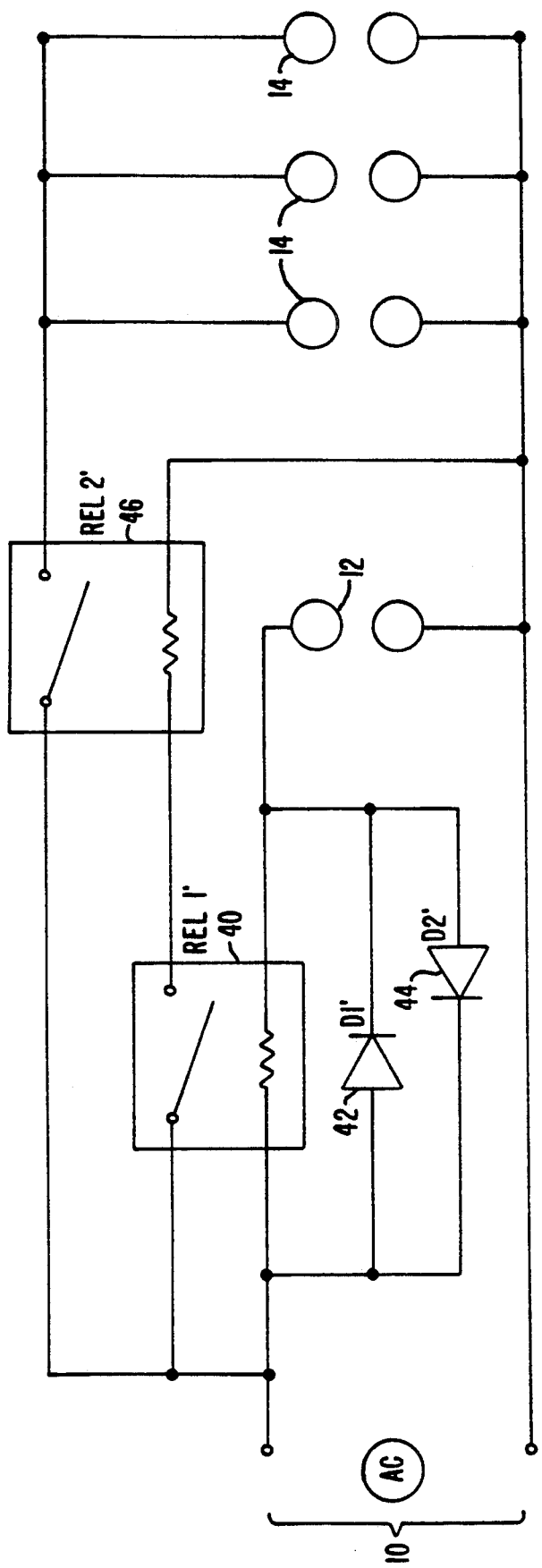
FIG. 3 is a circuit schematic of a second embodiment of the electrical connector network of FIG. 1 with a first relay (Rel.1'), diodes (D1', D2'), and a second relay (Rel.2').

In another exemplary embodiment, illustrated in FIG. 3, a current sensing relay 40 is connected between power inlet 10 and control outlet 12. In order to extend the current sensing range of relay 40 beyond the power handling capacity of the relay coil, diodes 42 and 44 are disposed in a short circuit across relay 40. A second power relay 46 is connected between power inlet 10 and slave outlets 14, the relay 46 being responsive to current flow through relay 40. In this embodiment, current flow to the control outlet closes relay 40, causing current flow through relay 40 to relay 46, closing relay 46 and connecting slave outlets 14 to power inlet 10.

Figure 4:
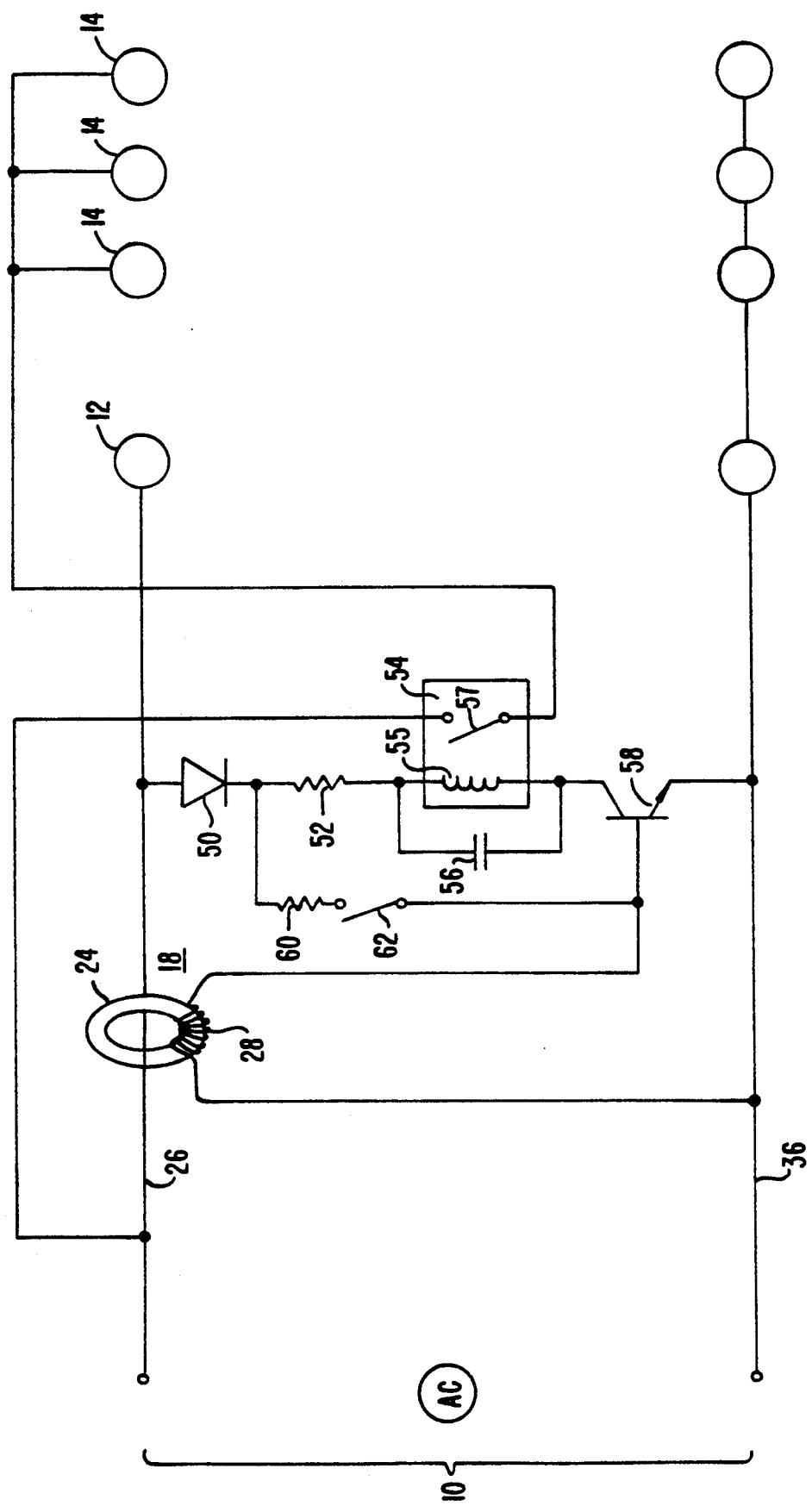
FIG. 4 is a circuit schematic of a third embodiment of the electrical connector network of FIG. 1.

In a third embodiment of the present invention, as shown in FIG. 4, a current sense transformer 24 is configured between power inlet 10 and control outlet 12. A relay 54 in series with a transistor 58 are connected between inlet line 26 and ground line 36. A diode 50 and resistor 52 between inlet line 26 and relay 54, along with capacitor 56 in parallel with relay 54, insure current through relay 54 is non-fluctuating and unidirectional.

The circuit operates as follows. When current flows to control outlet 12, it is sensed by current sense transformer 18, generating a secondary current in coils 28. The secondary current activates transistor 58, causing current flow through the coil 55 of relay 54. This actuates the switch 57, causing current flow to slave outlets 14 from power inlet 10.

A further embodiment of the invention provides an override switch 62 in series with a resistor 60, in a bypass circuit around relay 54. This permits the slave outlets 14 to be turned ON without current flow to control outlet 12.

The embodiment of the invention as shown in FIG. 4 has no power dissipation when no current flows to control outlet 12, and less than 1 watt dissipation when current flows to control outlet 12 turning on slave outlets 14. Further, by using a relatively low current level relay 54, a certain amount of hysteresis is obtained which keeps the relay from "chattering" ON and OFF at control current levels at or near the relay's actuation threshold.

Figure 5:
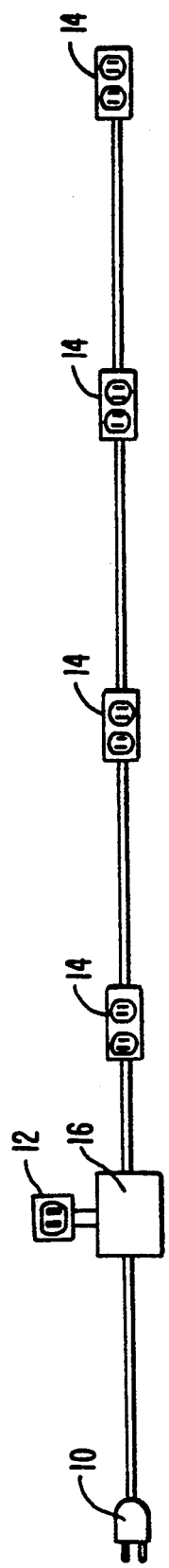
FIG. 5 is a front elevational view of an electrical extension cord including the electrical connector network of the invention.
Figure 7:
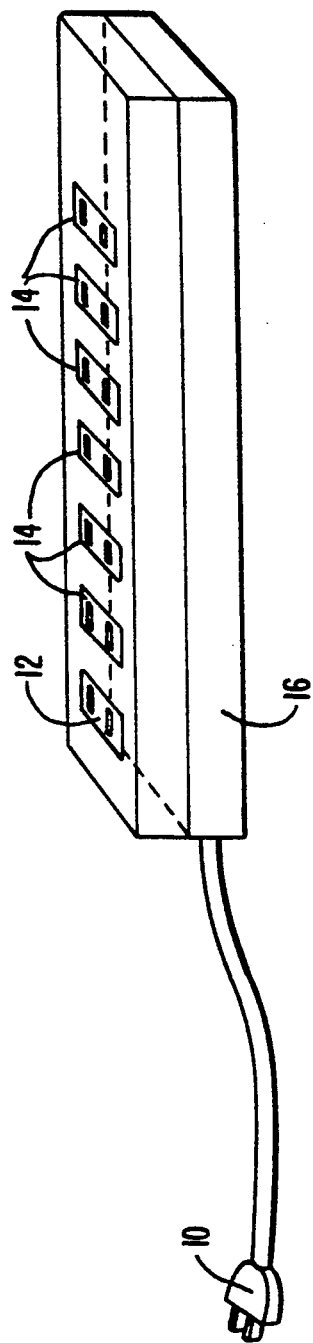
FIG. 7 is a perspective view of a power strip
Figure 6:
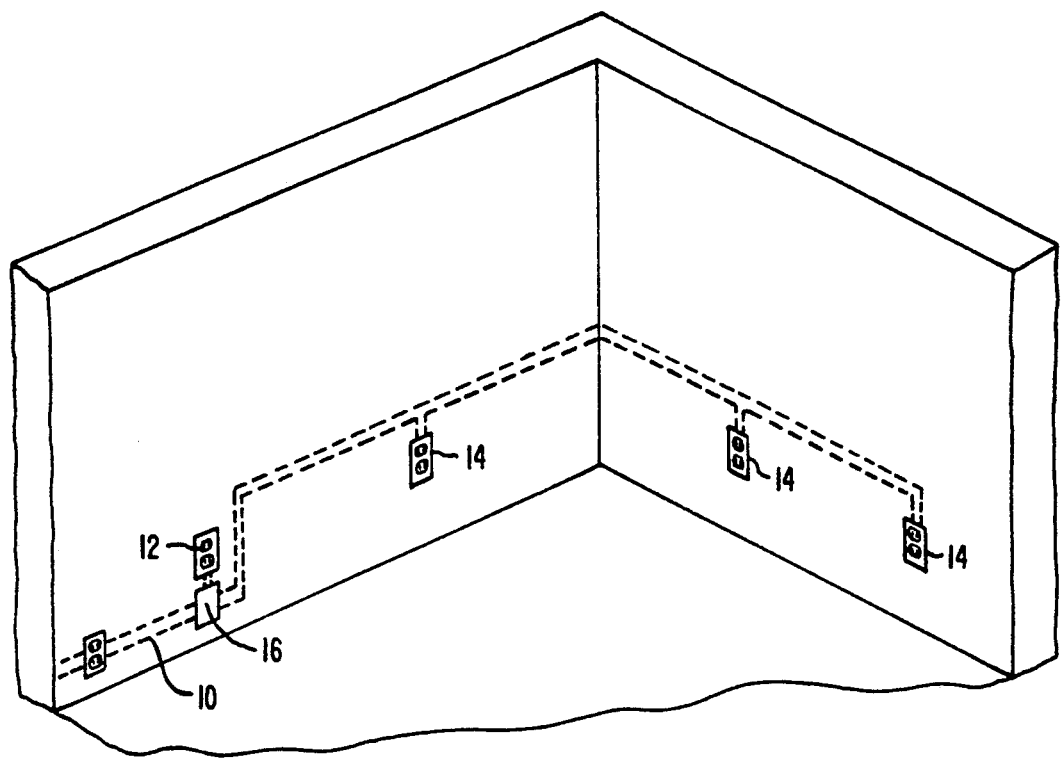
FIG. 6 is a perspective view of a building structure including wall outlets incorporating the electrical connector network of the invention.

In various embodiments, slave outlets 14 and control outlet 12 are disposed in, for example, an electrical extension cored as shown in FIG. 5, wall outlets in a building or other structure as shown in FIG. 6, a power strip as shown in FIG. 7, or the housing of an electrical or electronic device such as a personal computer or stereo. Such a power strip typically comprises a rigid housing of metal or similar material in which are mounted a number of electrical outlets connected to a power cord connectable to a wall outlet. The invention is not limited, however, to these embodiments, and the control and slave outlets could be arranged in any number of configurations adapted to meet any need for a coordinately-controlled multiple connector network.

Preferably, usually in the power strip embodiment, the connector network further includes a power noise filter (not shown) between power inlet 10 and control and slave outlets 12, 14. The power noise filter filters out voltage non-linearities to protect the components connected to the connector network. This is particularly useful for computer systems, which are especially susceptible to damage from voltage spikes.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. An electrical connector network comprising:
an electrical power inlet;
a control outlet connected to the power inlet for interchangeable connection of electrical appliances, whereby power from the power inlet is available at the control outlet;
at least one slave outlet; and
means responsive to current flow to the control outlet for selectively connecting the slave outlet to the power inlet, whereby power is available at the slave outlet only when current flows through the control outlet, said means responsive to current flow comprising:
a transformer having a primary for sensing current to the control outlet and a secondary for generating a secondary current when current flows to the control outlet;
a transistor coupled directly to the secondary of the transformer so as to be driven by the secondary current;
a relay having a switch connected between the power inlet and the slave outlet and a coil connected between the power inlet and the transistor such that secondary current flow to the transistor causes the relay to connect the slave outlet to the power inlet; and
a capacitor connected in parallel with the coil of the relay for eliminating fluctuation of current through the coil.

2. The network of claim 1 wherein said control and slave outlets are disposed in an electrical extension cord.

3. The network of claim 1 wherein said control and slave outlets are disposed in wall outlets.

4. The network of claim 1 wherein said control and slave outlets are disposed in a power strip.

5. The electrical connector network of claim 1 wherein the capacitor serves as a power noise filter.

6. The electrical connector network of claim 1 further comprising an override switch configured to bypass said relay, wherein actuating the switch connects the slave outlets to the power inlet irrespective of current flow to the control outlet.

7. The electrical connector network of claim 1 wherein the network has power dissipation of zero when no current flows to the control outlet.

8. The electrical connector network of claim 1 wherein the network has power dissipation of less than 1 watt when current flows to the control outlet.

9. The electrical connector network of claim 1 wherein the relay has an actuation threshold current level selected so as to eliminate chattering of the switch in the relay.

10. The electrical connector network of claim 1 wherein said control and slave outlets are disposed in an electronic component housing.

11. An electrical connector network as in claim 1 wherein the power inlet receives alternating current, the transformer sensing the alternating current flow to the control outlet to produce a secondary alternating current in the secondary.

12. An electrical connector network as in claim 11 further comprising a diode connected between the power inlet and the coil of the relay for making the current through the coil unidirectional.

13. The electrical connector network of claim 1 wherein the primary of the transformer is disposed between the power inlet and the coil of the relay such that the transformer senses the current flow through the coil in addition to current flow to the control outlet when the relay is actuated.

14. An electrical connector network comprising:
   an electrical power inlet for receiving alternating current from a power source;
   a control outlet connected to the power inlet for interchangeable connection of electrical appliances, whereby alternating current from the power inlet is available at the control outlet;
   at least one slave outlet;
   a transformer having a primary for sensing current to the control outlet and a secondary for producing a secondary alternating current in response to current flow to the control outlet;
   a transistor connected directly to the secondary of the transformer so as to be driven by the secondary alternating current;
   a relay having a switch connected between the power inlet and the slave outlet and a coil connected between the power inlet and the transistor such that the relay connects the slave outlets to the power inlet in response to flow of the alternating secondary current to the transistor;
   a capacitor connected in parallel with the coil of the relay for eliminating fluctuation of current through the coil;
   a diode connected in series with the coil of the relay for converting the alternating current from the power inlet into a unidirectional current through the coil.

15. The electrical connector network of claim 14 wherein the network has a power dissipation of zero when no current flows to the control outlet.

* * * * *